United States Patent [19]

Szanto et al.

[11] 4,169,217
[45] Sep. 25, 1979

[54] LINE STATUS APPARATUS FOR TELEPHONES

[75] Inventors: Attila J. Szanto; Garth D. Hillman, both of Ottawa; Edward C. Carew, Carleton Place, all of Canada

[73] Assignee: Northern Telecom Limited, Montreal, Canada

[21] Appl. No.: 881,712

[22] Filed: Feb. 27, 1978

[51] Int. Cl.² .................... H04M 1/00; H04M 1/68
[52] U.S. Cl. .................................. 179/81 C; 179/81 E
[58] Field of Search ................ 179/81 R, 81 C, 81 E, 179/84 R, 84 L, 1 MN

[56] References Cited
U.S. PATENT DOCUMENTS

| 2,496,642 | 2/1950 | Shann | 179/81 C |
| 3,899,644 | 8/1975 | Hunt | 179/84 R |
| 3,961,142 | 6/1976 | Caffine | 179/81 R |

Primary Examiner—Kathleen H. Claffy
Assistant Examiner—Joseph A. Popek
Attorney, Agent, or Firm—Sidney T. Jelly

[57] ABSTRACT

In a telephone installation in which more than one telephone terminal is connected to one pair of conductors—Tip and Ring—a line status apparatus is provided for each telephone terminal, the apparatus sensing a change in line characteristics resulting from an "off-hook" condition at any telephone and producing an output which is used to provide an indication. Little or no current is drawn from the telephone lines. Typical examples are sensing variations in AC characteristics, as resulting from voice transmission, ringing tones and the like; sensing DC variations, such as voltage drop when a telephone is "off-hook". Indication is generally visual.

10 Claims, 4 Drawing Figures

LINE STATUS APPARATUS FOR TELEPHONES

This invention relates to line status apparatus for telephones and in particular is applicable to telephones not having built-in line status indicators. Thus the invention is applicable, for example, to domestic telephones where more than one telephone is connected to one pair of conductors. Similarly the invention is applicable to small businesses where only one telephone line is provided, i.e. one pair of conductors, but having two or more telephones connected.

The invention provides an indication, usually visual, at each telephone provided with the invention, of the status of the line. The invention can be applied to each, or any one or more, of the telephones connected. If the telephone is provided with a "hold" facility, the invention will also give an indication.

Broadly, the invention comprises a transducer circuit applied across, or between the Tip and Ring of a telephone line and which generates an output while any terminal attached to the line is "off-hook." The output is used to actuate an indicator generally visual. The apparatus is automatic, that is it does not need a manual input before sensing. The transducer draws no current, or at the most an extremely small current, from the telephone line.

The invention will be readily understood by the following description of certain embodiments, by way of example, in conjunction with the accompanying drawings, in which.

The system specifications for telephones of the type above described—conveniently referred to as "non-PBX"—can be classified into two categories; "on-hook" specifications and "off-hook" specifications. The particular features which affect any apparatus connected across Tip and Ring are:

"On-Hook"
(i) The DC impedance between Tip and Ring; Tip and ground; or Ring and ground should not be less than 50MΩ;
(ii) Operation of any of up to four terminals in parallel with the equipment under characterization must not be impaired by that equipment;
(iii) The equipment must be able to withstand the ringing voltages of ≈500V peak-to-peak;
(iv) The equipment must be able to withstand a voltage transient of 1000 volts of either polarity and having a 10 μs rise time and a decay time to the 500V point of 1 msec;
(V) The conventional POTS equipment must be disconnected from the loop in a balanced fashion by switching both Tip and Ring lines via the hook switch.

"off-hook"
(i) The equipment performance must be relatively insensitive to temperature variations from 0° C. to 50° C.;
(ii) The equipment performance must not be degraded by RFI having a maximum intensity of 5 volts/meter;
(iii) The equipment must interface to the loop via the standard two conductors designated as Tip and Ring.

To be automatic, the circuit must be located on the CO side of the hook switch and therefore its performance must meet both sets of specifications. This in turn results in certain design objectives.

In its broadest aspect the invention provides a status sensing circuit which gives indication, usually visual, which is sensitive to voltage, not current; is protected against lightning; immune to radio frequency interference (RFI); tolerant of temperature variations 0° C. to 50° C.; has a predetermined minimum input impedance; and has a predetermined maximum leakage from Tip to Ring.

Figure 1:
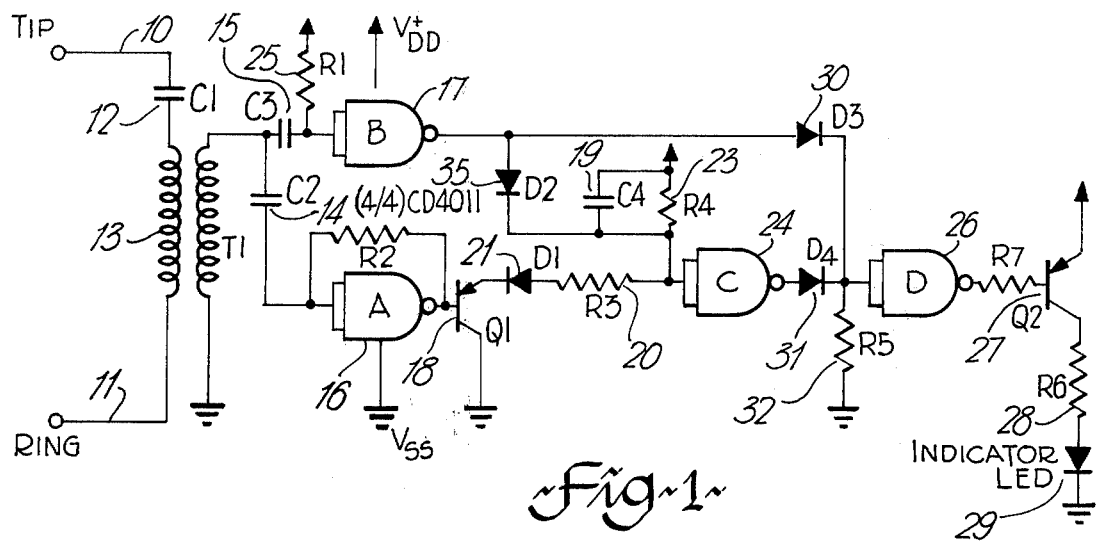
FIG. 1 is a diagrammatic circuit for sensing AC voltages between Tip and Ring.

Various sensing techniques, or arrangements, can be provided in accordance with the invention. FIG. 1 is a diagrammatic circuit of an arrangement which senses the pressence of AC voltages between Tip and Ring which are characteristic of the "off-hook" state, to generate corresponding control signals. Possible sources of such an AC voltage are: ringer signal, ring-back tone, busy tone, dial tone and the human voice. A quasi-continuous indication of the off-hook condition can be obtained by selecting an appropriate time constant and detecting any of the above mentioned sources—except ringing waveform. By using an approach with a higher threshold and different time constant, than those used for the other sources, generation of a suitable discontinuous control signal in response to the ringing waveform can be obtained.

Considering FIG. 1 in more detail, the low frequency AC potential across Tip 10, and Ring 11 is coupled via capacitor 12, transformer 13 and capacitors 14 and 15 to amplifiers 16 and 17. Amplifier 16 is a linear amplifier which amplifies the signal coupled to it by capacitor 14. The output of 16 controls transistor 18. When an AC signal is present 18 will be turned on, during the positive going voltage transitions. When 18 is turned on it permits the time constant capacitor 19 to quickly charge to $V_{DD} - 2V_D \approx 10$ volts through resistor diode 21 and, of course, transistor 18. This is a relatively low resistance path hence the charging time constant is short, $\tau_c \approx 5$ms. During the negative excursions of the AC signal or when that signal has been removed capacitor 19 will discharge through resistor 23. This discharge time constant $\tau_d$ is selected according to the application and is usually long. As a particular example, for the present circuit, an effective $\tau$hd d of ~5 sec is selected so that a "lull in the conversation" of up to 5 seconds can be accommodated before the control signal is switched off. The input node to the time constant amplifier 14 could not be driven directly by the output of amplifier 16, due to the large output impedance of 16 which, in turn, would result in a large $\tau_c$. When the AC potential across Tip and Ring is due to the ringer signal, amplifier 17 is activated. The threshold of 17 is intentionally set high by resistor 25 so that only the large negative excursions of the ringing waveform coupled to amplifier 17 through capacitor 15 are sufficient to trigger 17 into changing its output from the normal low state to a high. The output of 17 is a control signal which has the 20 Hz frequency of the ringer signal. Gate 26, transistor 27, current limiting resistor 28 and the LED 29 form the indication circuit. When the input to 26 goes high 27 is turned on and the LED 29 emits light providing a visual indication of the line status. Diodes 30 and 31 together with resistor 32 form an "OR" gate which couples the control signals from 19 and 24 to gate 26. Both amplifiers 16 and 17 will sense the ringing waveform. The control signal from 16 will be active for a relatively long time (compared to the 50 msec ringer waveform period), whereas the control signal from 17 will follow the ringing waveform. Since it is desirable in many cases to have a visual alerting indication, the control signal from 16 must be disabled and the control signal from 17 used to blink the indicator in step with the ringer waveform. This is accomplished by diode 35 as follows: When the output of 17 is high, indicating a ringer waveform, the input node of 24 is held high even though 18 is on. This prevents capacitor 19 from charging and the indication circuit is driven only by the output of amplifier 17.

The design objectives are met by:
 (i) Capacitively coupling across Tip and Ring.
 (ii) The capacitor is chosen to be not larger than one tenth of the standard ringer capacitor.
 (iii) DC isolating the sensing circuit from the loop by transformer coupling.
 (iv) Using only passive elements between Tip and Ring.
 (v) Using standard components which have been characterized over the prescribed temperature range.
 (vi) Setting the upper cut-off frequency low enough to discriminate against RFI inputs.

An alternative arrangement is to sense the change in DC voltage between Tip and Ring when the telephone terminal goes "off-hook." The DC voltage change is sensed indirectly and a corresponding signal generated. The indirect method of sensing a DC voltage change requires a change in device characteristics in response to a change in DC voltage across the device, i.e. a transducer. A control circuit must then be designed to react to the change in the device parameters and generates a corresponding signal.

Figure 2:
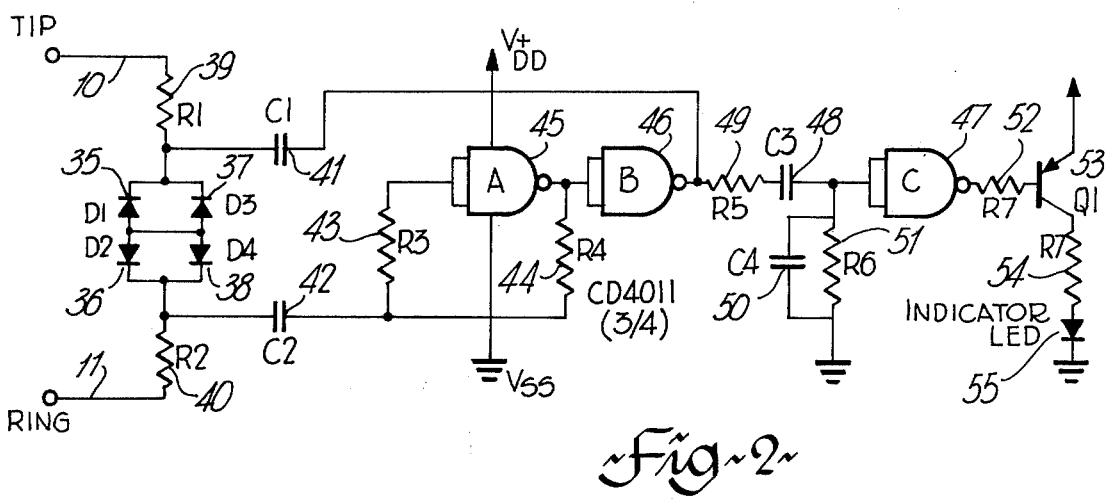
FIG. 2 is a diagrammatic circuit for sensing a change in DC voltage across Tip and Ring.

One embodiment of this arrangement is illustrated in FIG. 2. In this implementation the transducer is a standard rectifier diode; the voltage dependent characteristic is its anode to cathode capacitance; the control circuit is an oscillator whose frequency of oscillation depends upon this diode capacitance.

Considering FIG. 2, the DC voltage across Tip 10 and Ring 11 is coupled to diodes 35, 36, 37 and 38 via resistors 39 and 40. These diodes are connected back to back to make the circuit insensitive to voltage polarity. There are two capacitances associated with any diode, the diffusion capacitance which is operative when the diode is forward biased and the depletion capacitance which is operative when the diode is reversed biased. Since the diode pairs 35, 36, 37 and 38 are back to back both of these mechanisms come into play. In the on-hook state the maximum voltage of ∼48 V across Tip and Ring will induce a minimum capacitance across the diode set. This capacitance, $C_{diode}$, is AC coupled via capacitors 41 and 42 into the feedback path of an RC phase shift oscillator circuit. The effective elements in the oscillator circuit are $C_{diode}$, resistors 43 and 44, and amplifiers 45 and 46. A minimum $C_{diode}$ will result in a certain upper frequency of oscillation. The output of the oscillator is AC coupled to the buffer amplifier 47 through capacitors 48 and resistor 49. A by-pass network consisting of capacitor 50 and resistor 51 is also connected to the input node of amplifier 47. The elements of the by-pass network are selected to short the signal from the oscillator having the upper frequency (on-hook) to ground so that 47 is not triggered and the control signal output from 47 remains high. In the off-hook state however, $C_{diode}$ is a maximum as the voltage across Tip and Ring decreases to a value $\leq 15V$. This causes the oscillator to oscillate at a lower frequency. This signal is not shunted to ground and does toggle amplifier 47. The indication network consists of bias resistor 52, transistor 53, current limiting resistor 59 and an LED 55. When the output of 47 goes low, 53 is turned on and the LED emits light to give a visual indication. When the ringer waveform is superimposed on the line voltage the change in $C_{diode}$ is sufficient to cause the LED to blink at the ringing frequency (20Hz) to provide the visual alerting function.

In the arrangement of FIG. 2, the design objectives are met by:
 (i) Having a low leakage reverse biased diode effectively across Tip and Ring.
 (ii) Protecting the diode with two 1 MΩ resistors in a balanced configuration.
 (iii) DC isolating the sensing circuit from the loop by capacitance coupling.
 (iv) Using standard components which have been characterized over the prescribed temperature range.
 (v) Using an RFI tolerant control circuit.
 (vi) Using diodes in back-to-back configuration.

Figure 3:
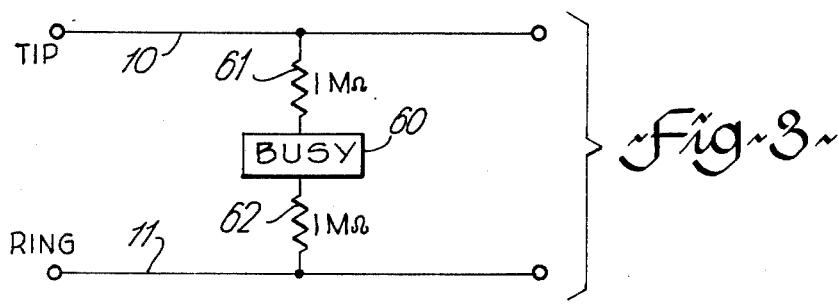
FIGS. 3 and 4 illustrate diagrammatically a direct and an indirect display using a liquid crystal, responsive to the DC change across Tip and Ring.

A further arrangement, indirectly sensing DC voltage, involves the use of a transducer having nonelectrical characteristics which change in response to the DC voltage change, such characteristics being, for example, transmittance or color. FIG. 3 illustrates an extremely simple arrangement using a liquid crystal display (LCD) indicated at 60, which is connected across the Tip and Ring, 10 and 11, via resistors 61 and 62. The LCD must have a characteristic such that at 50V it is opaque and at 10V it is transparent. The LCD therefore displays the line status directly. Various forms of display, and back lighting arrangements, are possible. As an example, the LCD can be constructed to show a descriptive message, depending upon the line status. The LCD flashes in response to the ringer waveform. Design objectives are met by:
 (i) Having a low leakage LCD across Tip and Ring.
 (ii) Protecting the LCD by two 1 MΩ resistors in a balanced configuration.
 (iii) Using LCD's which have been specified over the 0° C. to 50° C. operating range.
 (iv) Using LCD's which are RFI tolerant.

Figure 4:
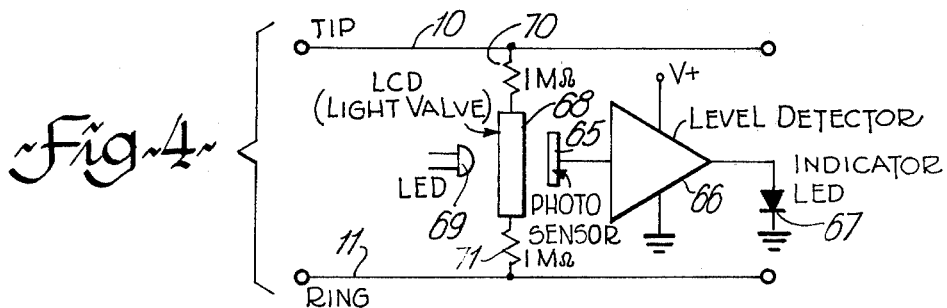

An indirect display approach is illustrated in FIG. 4. A photosensor 65 is connected to a comparator 66 which has a controllable threshold. The output from 66 drives an LED display 67. The line voltage is sensed by a LCD 68, which controls the light reaching the photosensor 65 from a light source, such as an LED 69 which is permanently on. In one state, the LCD "shutter" is closed and the indicator LED 67 is off. In the other state the LCD "shutter" is open and the indicator 67 is on. The LCD 68 will "flash" in response to the ringer waveform, resulting in flashing of the indicator LED 67. Again the LCD 68 is across the Tip and Ring via resistors 70 and 71. The design objectives are met by:
 (i) Having a low leakage LCD across Tip and Ring.
 (ii) Protecting the LCD by two 1 MΩ resistors in a balanced configuration.
 (iii) Using LCD's which have been specified over the 0° C. to 50° C. operating range.
 (iv) Using LCD's which are RFI tolerant.

(v) DC isolation is provided by optically coupling the sensing circuit to the transducer connected between Tip and Ring.

What is claimed is:

1. In a telephone installation having a plurality of telephone terminals connected to a common pair of Tip and Ring lines, a line status indicating apparatus at each telephone terminal, each said line status indicating apparatus comprising a status sensing circuit including a transducer across the Tip and Ring lines, each of said status sensing circuits activated by an "off-hook" condition occurring at any of said telephone terminals to produce an output indicative of said condition.

2. The apparatus as claimed in claim 1, said status sensing circuit including a visual indicator.

3. The apparatus as claimed in claim 1, said sensing circuit including means for sensing AC voltage characteristics of the lines and for producing said output when said characteristics vary from a predetermined datum.

4. The apparatus as claimed in claim 3, said status sensing circuit including means for capacitive coupling across said Tip and Ring lines, and having a capacitance substantially less than a standard ringer capacitor; means for DC isolating said sensing circuit from the telephone loop; and separate power supply means to said sensing circuit, whereby no current is drawn from the telephone lines.

5. The apparatus as claimed in claim 1, said status sensing circuit including means for sensing a change in DC voltage between Tip and Ring in an "off-hook" condition, and means for producing said output when said DC voltage change occurs.

6. The apparatus as claimed in claim 5, including diodes in back-to-back configuration for voltage polarity insensitivity, and capacitance coupling means for DC isolation of said sensing circuit.

7. The apparatus as claimed in claim 5, said means for sensing DC voltage change and said means for producing said output comprising a liquid crystal display, said display having an opacity which varies with variation in said DC voltage.

8. The apparatus as claimed in claim 7, said liquid crystal display transparent at a low voltage associated with said "off-hook" condition and opaque at a higher voltage associated with an "on-hook" condition.

9. The apparatus as claimed in claim 5, said sensing circuit including a liquid crystal device connected across said Tip and Ring and opaque at a higher voltage on "on-hook" conditions and transparent at a lower voltage on said "off-hook" condition; a light emitting device and a photodetector positioned on either side of said liquid crystal device, said photodetector producing said output when said liquid crystal device is transparent, and an indicator actuated by said output.

10. The apparatus as claimed in claim 9, said indicator comprising a light emitting diode, and a threshold device between said photodetector and said light emitting diode to limit actuation of said light emitting diode to a predetermined value of said output.

* * * * *